United States Patent
Coifman et al.

(10) Patent No.: US 7,589,772 B2
(45) Date of Patent: Sep. 15, 2009

(54) SYSTEMS, METHODS AND DEVICES FOR MULTISPECTRAL IMAGING AND NON-LINEAR FILTERING OF VECTOR VALUED DATA

(76) Inventors: Ronald R. Coifman, 11 Hickory Hill Rd., North Haven, CT (US) 06473; Frank Geshwind, 61 Wellsweep Dr., Madison, CT (US) 06443; Andreas C. Coppi, 263 Bridge St., Groton, CT (US) 06340; William G. Fateley, 8459 River Valley Dr., Manhattan, KS (US) 66502; Richard A. Deverse, 74-5191 Kanai Pl., Kailua-Kona, HI (US) 96740; Yosi Keller, c/o Plain Sight Systems, Inc. 1020 Sherman Ave., Hamden, CT (US) 06514; Alon Schclar, Sokolov 51 Street, Holon, 58268 (IL)

( * ) Notice: Subject to any disclaimer, the term of this patent is extended or adjusted under 35 U.S.C. 154(b) by 538 days.

(21) Appl. No.: 11/524,127

(22) Filed: Sep. 20, 2006

(65) Prior Publication Data

US 2007/0206103 A1   Sep. 6, 2007

Related U.S. Application Data

(60) Provisional application No. 60/719,004, filed on Sep. 21, 2005.

(51) Int. Cl.
  *H04N 9/093* (2006.01)
  *H04N 3/14* (2006.01)
(52) U.S. Cl. ............... 348/263; 348/273; 348/280; 382/162
(58) Field of Classification Search ............ None
See application file for complete search history.

(56) References Cited

U.S. PATENT DOCUMENTS

| 5,166,755 | A | 11/1992 | Gat |
| 5,568,186 | A | 10/1996 | Althouse |
| 6,366,318 | B1 * | 4/2002 | Smith et al. ............ 348/272 |
| 7,088,392 | B2 * | 8/2006 | Kakarala et al. ........ 348/272 |
| 7,315,331 | B2 * | 1/2008 | Franzen ................ 348/452 |
| 7,492,396 | B2 * | 2/2009 | Kim et al. ............. 348/234 |
| 2003/0117507 | A1 * | 6/2003 | Kehtarnavaz et al. .... 348/242 |
| 2005/0200733 | A1 * | 9/2005 | Malvar ................. 348/272 |

OTHER PUBLICATIONS

Schechner et al., "Generalized Mosaicing," Eighth International Conference on Computer Vision (ICCV'01), vol. 1, p. 17, (2001).
Schechner et al., "Generalized Mosaicing: Wide Field of View Multispectral Imaging," IEEE Transactions on Pattern Analysis and Machine Intelligence, vol. 24, No. 10 (Oct. 2002).

* cited by examiner

*Primary Examiner*—Ngoc-Yen T Vu
(74) *Attorney, Agent, or Firm*—Fulbright & Jaworski L.L.P.

(57) ABSTRACT

An apparatus and method for multispectral imaging comprising an array of filters in a mosaic pattern, a sensor array and an acquisition and processing module. The sensor array being disposed to receive an image that has been filtered by the array of filters. The acquisition and processing module processes the output of the sensor array (or mosaic acquired data) to provide a processed image. The acquisition and processing module processes the mosaic acquired data by performing first interpolation on the mosaic acquired data by the sensor array to provide a first approximation and performing second interpolation on the values of the first approximation to provide a second approximation.

20 Claims, 7 Drawing Sheets

FIG. 3

| Y | $C_1$ | Y | $C_1$ | Y | $C_1$ |
|---|---|---|---|---|---|
| $C_2$ | Y | $C_2$ | Y | $C_2$ | Y |
| Y | $C_1$ | Y | $C_1$ | Y | $C_1$ |
| $C_2$ | Y | $C_2$ | Y | $C_2$ | Y |
| Y | $C_1$ | Y | $C_1$ | Y | $C_1$ |
| $C_2$ | Y | $C_2$ | Y | $C_2$ | Y |

SYSTEMS, METHODS AND DEVICES FOR MULTISPECTRAL IMAGING AND NON-LINEAR FILTERING OF VECTOR VALUED DATA

RELATED APPLICATION

This application claims priority benefit under Title 35 U.S.C. § 119(e) of provisional patent application No. 60/719,004, filed Sep. 21, 2005, which is incorporated by reference in its entirety.

BACKGROUND OF THE INVENTION

The present invention relates to devices and methods for enhanced imaging, and more particularly, in part, to multispectral imaging, by mosaics and arrays of sensors designed to measure a filtered version of the light reaching them, and to methodologies for calibrating the response and processing the output of such sensors and arrays.

There is a vast amount of technology that comprises the state of the art in advanced imaging and multispectral imaging. Some background may be found, for example, in a patent to some of the present inventors: U.S. Pat. No. 6,859,275, "System and Method for Encoded Spatio-Spectral Information Processing", Fateley et al., which is incorporated herein by reference in its entirety.

Spectral imaging systems typically have dynamic components such as moving parts or adaptive parts such as tunable filters, in order to accomplish the acquisition of spectral image information. These dynamic components are typically expensive and require complex calibration and processing.

Color cameras typically measure only three channels of color information (such as red, green and blue). As such they are limited in their use as spectral imagers. Also, color cameras typically sample colors in a so-called mosaic pattern. This means that each pixel only measures one color, with the three different color measurements happening at three different pixels—typically in a repeating pattern such as but not limited to Bayer patterns. See U.S. Pat. No. 3,971,065 to Bayer, "Color Imaging Array", which is incorporated herein by reference in its entirety.

Therefore ordinary color cameras are limited in their capacity as advanced or spectral imaging devices for at least two reasons. First because of the limited amount of spectral information that they provide (only 3 colors). Second because the full color information is not measured per-pixel but only by mosaic. In the U.S. Pat. No. 3,971,065, Bayer states that "relative image sampling rates, by color, are in effect adjusted respective of the characteristics of human visual response." While this is of some use for images to be viewed by humans, there is a need for more general systems, for example for scientific and engineering applications wherein human visual response is not the system response of interest. Even when images are to be viewed by humans, there is a need for an improved system for at least the following reasons. Standard techniques are available to model the missing information for a mosaic sensor, and these comprise various kinds of interpolation. Such interpolations are used to "guess" or "fill in" the missing/non-measured color information. However, these guesses can be wrong and the filled in data may, for example, appear blurry as a result. In particular, at an edge or boundary, simple interpolation will yield a result that can be far from correct. Consequently there is a need for improved methods for interpolation of missing sampled data from mosaic cameras.

Beyond spectral imaging systems, advanced imaging devices in general are needed for a variety of applications. Such advanced imaging systems include but are not limited to high resolution imaging systems, wide field-of-view imaging systems, artifact correcting imaging systems, and high dynamic range imaging systems, to name a few. In both design and use, state of the art imaging systems require tradeoffs between factors including but not limited to resolution, field-of-view, contrast, image quality, color, spectral detail and cost. Consequently there is and will always be a need for improved imaging systems that allow for better image quality of these various kinds, or, put differently, that enable better choices to be made in, for example, the tradeoffs just described.

The state of the art in advanced imaging includes mosaic imaging for enhanced imaging including multispectral imaging and improved resolution, field of view and other parameters. Examples of existing systems for such may be found in the paper "Generalized Mosaicing", by Schechner and Nayar, *Eighth International Conference on Computer Vision* (*ICCV'01*), 2001, Volume 1, pp. 17-24, which is incorporated by reference. In that paper, mosaic imaging systems are taught that accomplish multispectral imaging, and other related designs for improved resolution, field of view and other parameters. Briefly these goals are accomplished by providing a mosaic of sensors with spatially varied properties, so that as a camera is scanned over a scene, multiple measurements of each scene point are obtained under different optical settings. While this approach accomplishes the stated goals, it requires scanning of a scene to produce the desired information. This scanning requires registration from one frame to the next, to accomplish the data fusion. However, there is information in even a single frame of image data, and it is desirable to have systems that extract as much of this information as possible. It is also desirable to have systems that, while capable of exploiting the extra information provided by scanning a scene multiple times, do not require such scanning.

In summary there is a need for devices, methods and systems for spectral imaging and advanced imaging with improved performance in one or more of image quality, contrast, resolution, field-of-view, color, spectral detail and cost, and for improved methods for interpolation of missing sampled data from mosaic imaging systems.

OBJECT AND SUMMARY OF THE INVENTION

Therefore, it is an object of the present invention in one aspect, to provide devices, methods and systems for spectral imaging by means of a camera comprising a mosaic pattern of spectral filters, together with the necessary algorithms to substantially fill in the missing sampled data from the mosaic information that the camera collects.

In accordance with an exemplary embodiment of the present invention, a mosaic sensor array that measures a variety of optical properties of the pixels of the scene, and then applying an adaptive interpolation to fill in the missing data in accordance with the techniques disclosed herein. In doing so, the present invention allows for the substantial recovery of a full set of distributed and possibly weighted bands of spectral responsivity measures from a limited sampling of spectral bands within the spectral range of interest, by the methods disclosed herein. The adaptive interpolation methods, described in detail elsewhere herein, are comprised of non-linear interpolation techniques wherein, for each pixel, measured data at and near the pixel is used to create an adaptive interpolation filter for that pixel by mathematical inference. The filter is applied and the missing values are thereby substantially reconstructed.

Another object of the present invention is to provide devices, methods and systems for advanced imaging by means of a camera comprising a mosaic pattern of spatial or other optical filters, together with the necessary algorithms to substantially fill in the missing sampled data from the mosaic information that the camera collects, and to reconstruct an improved image wherein the improvement comprises one or more of resolution, contrast, field of view, image quality and spectral information. In accordance with an exemplary embodiment of the present invention, this can be accomplished as disclosed in more detail elsewhere herein, in a way similar to the spectral object just described—by providing a mosaic sensor array that measures a variety of optical properties of the pixels of the scene, and then applying an adaptive interpolation to fill in the missing data in accordance with the techniques disclosed herein.

For exemplary illustrative purpose only, the present invention is described herein in the context of spectral imaging. A key aspect is that spectral information is vector information. That is, for each pixel (picture element) in an image, the spectral information is comprised of a multiplicity of numbers associated with that pixel in a predetermined way. It is important in understanding the scope of the present invention, to understand that other imaging vector information can be processed in the same way, and that the spectral imaging examples disclosed in detail herein are merely examples of the more general invention. Therefore when examples and embodiments are disclosed herein in the context of spectral imaging, the use of spectral information is intended to be illustrative and not limiting, and these other advanced imaging embodiments are to be taken to be within the scope of the present invention.

A further object of the present invention is to provide improved imaging by modeling the improvement as the estimation of a vector for each pixel of the image being acquired, such that the vector field in question comprises information needed for the desired improvement. One example embodiment accomplishes improved image resolution as so described. A high resolution image may be modeled as a vector-valued low-resolution image. For example, a 512×512 image can be modeled as a 256×256 image, wherein each pixel is a 4 dimensional vector comprised of the 4 values of the "sub-pixels" of the high-resolution image. Specifically, for example, the vector associated with the first pixel in the first row of the low resolution image is comprised of the values of the pixels 1 and 2 of the first row of the high-resolution image, together with pixels 1 and 2 of the second row of the high-resolution image. In this way, if one can acquire or substantially reconstruct the relevant 4 dimensional vector of information for each pixel in the low-resolution image, one has then reconstructed the high resolution image. As disclosed herein, an embodiment of the present invention achieves high resolution imaging by filtering each pixel, in a mosaic pattern, with a suite of filters that measure aspects of the high resolution image, and applying the algorithms disclosed herein to the output of this sensor mosaic to substantially reconstruct the high-resolution image.

A device embodiment of the present invention comprises a mosaic of sensors similar to a two-dimensional CCD wherein the detector elements are each designed to measure a filtered version of the light spectrum reaching them. In such an embodiment, by virtue of the filters in or on the detector elements, each pixel of the device measures a specific, predetermined function of the spatio-spectral data of the scene being imaged. In an embodiment, the filters are taken from a predetermined set of filters, such set having more than one distinct element and typically substantially fewer distinct elements than the total number of sensors in the device so that many detectors in the device have the same filter. These sensor arrays are more complex, but are similar to conventional Red, Green, Blue (RGB) cameras where the detector elements or individual sensors are organized into discrete groups of red green or blue sensors. In the embodiments being described, then, the sensors are divided into classes of filtered sensors, each class having substantially the same filter function. An embodiment of the present invention, wherein the filters are spectral filters, comprises distributing each class of spectral sensors in a spatially uniform way across the array. For example in an application of uniform distribution we could have 9 different spectral bands sensors in each 3×3 group of adjacent sensors, say by repeating periodically the first group of 3×3. Although we use a spatially uniform distribution for this example we do not limit this disclosure to uniform distributions of sensors or detector elements with same or similar spectral responsivity. In applications where a uniform distribution is not required or desired a weighted distribution of spectral response functions can be implemented. For example we could have 9 spectral bands of responsivity with a multiplicity of one or more bands in the array as desired or needed.

Various embodiments of the present invention correspond with a variety of configurations of sensor filters. An embodiment comprises dividing a pre-defined spectral band such as the visible spectral region of 400 nm to 700 nm into 9 spectral bands. Another embodiment comprises dividing in a non-contiguous non-equispaced way the silicon spectral response band of 280 nm-1100 nm in order to optimize the ability to determine specific or generalized chemistries as needed. Further details and additional examples include but are not limited to the assignment of Hadamard encoded spectral filters to the various pixels within a set of pixels; the assignment of Fourier encoded spectral filters to the various pixels within a set of pixels; the assignment of randomly or pseudo-randomly encoded spectral filters to the various pixels within a set of pixels (particularly if the pseudo-random codes are selected in such a way that the family of codes is well conditioned); and others. Techniques for creating these filters include, but are not limited to, depositions of layers and/or films of wavelength dependent transmissivity/opacity, holographic films, quantum dots, photonic crystals and other special materials.

One embodiment comprises dividing the red region spectral band into three sub-bands by rejecting or passing a different ⅓ for each of three sensors, with a similar scheme of division implemented in the remaining blue and green spectral bands. Embodiments of the invention comprise mathematically encoding the filters on each sensor, and/or weighting them in a spectrometrically significant way that enables recovery of desired classes of spectral features that, for example, relate to specific materials or chemistries of interest in a qualitative and or quantitative manner.

The multispectral camera systems disclosed herein have use in a wide variety of applications, including but not limited to automated target recognition, detection and tracking of explosives, biohazards and other threats.

It should be noted that different embodiments of the invention may incorporate different combinations of the foregoing, and that the invention should not be construed as limited to embodiments that include all of the different elements.

BRIEF DESCRIPTION OF THE DRAWINGS

The present invention will be understood and appreciated more fully from the following detailed description, taken in conjunction with the drawings in which:

FIG. 3 shows another filter mosaic pattern corresponding to the Bayer pattern;

DETAILED DESCRIPTION OF THE EMBODIMENTS

Figure 1:
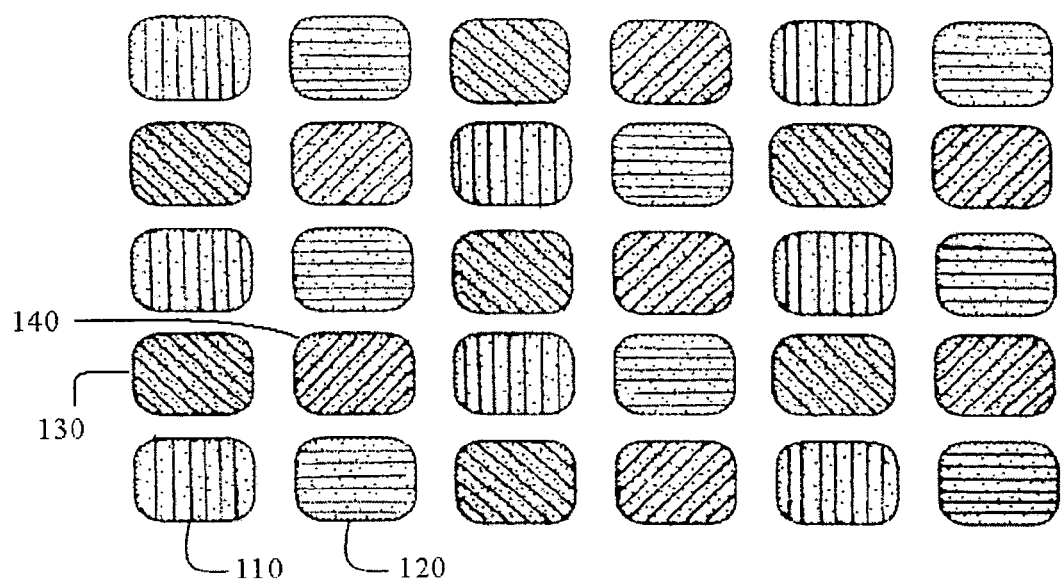
FIG. 1 shows a filter mosaic pattern for a mosaic filter imaging system in accordance with the prior art and, when combined with the processing disclosed herein, appropriate for use with an exemplary embodiment of the present invention.
Figure 2:
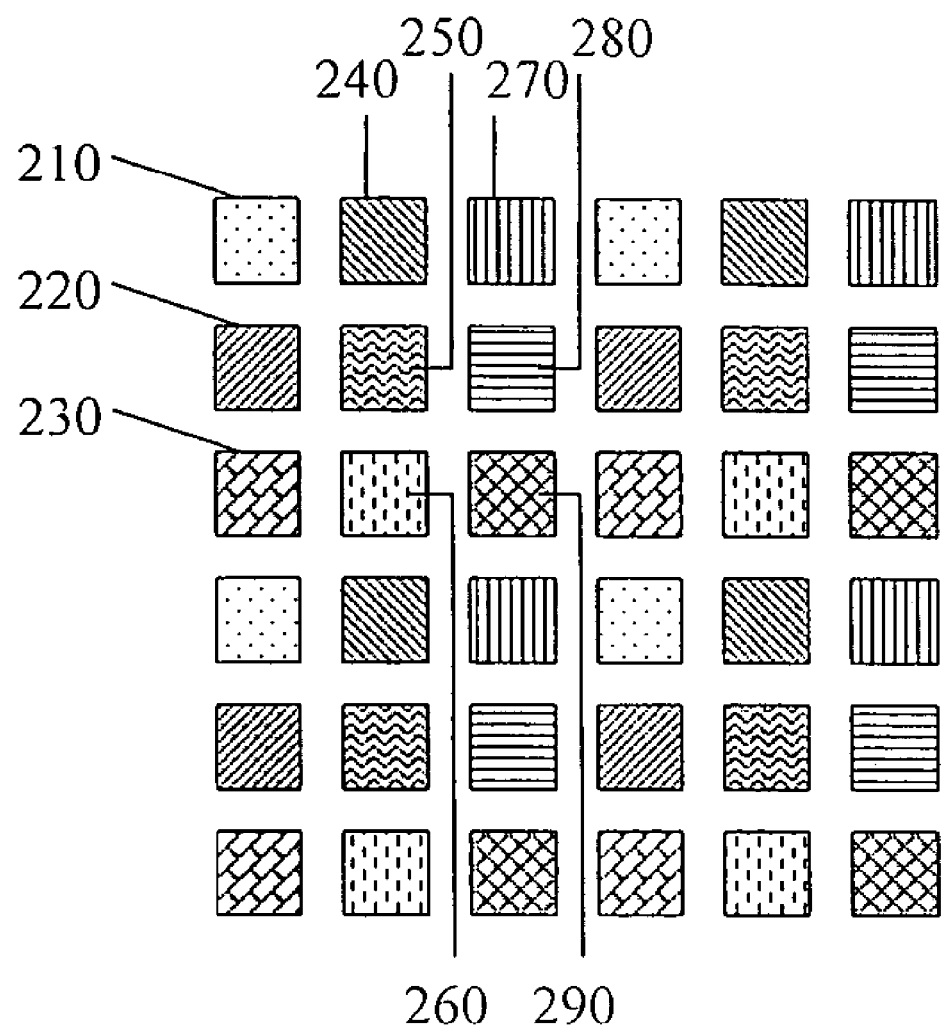
FIG. 2 shows another filter mosaic pattern with a 3 by 3 array mosaic.
Figure 4:
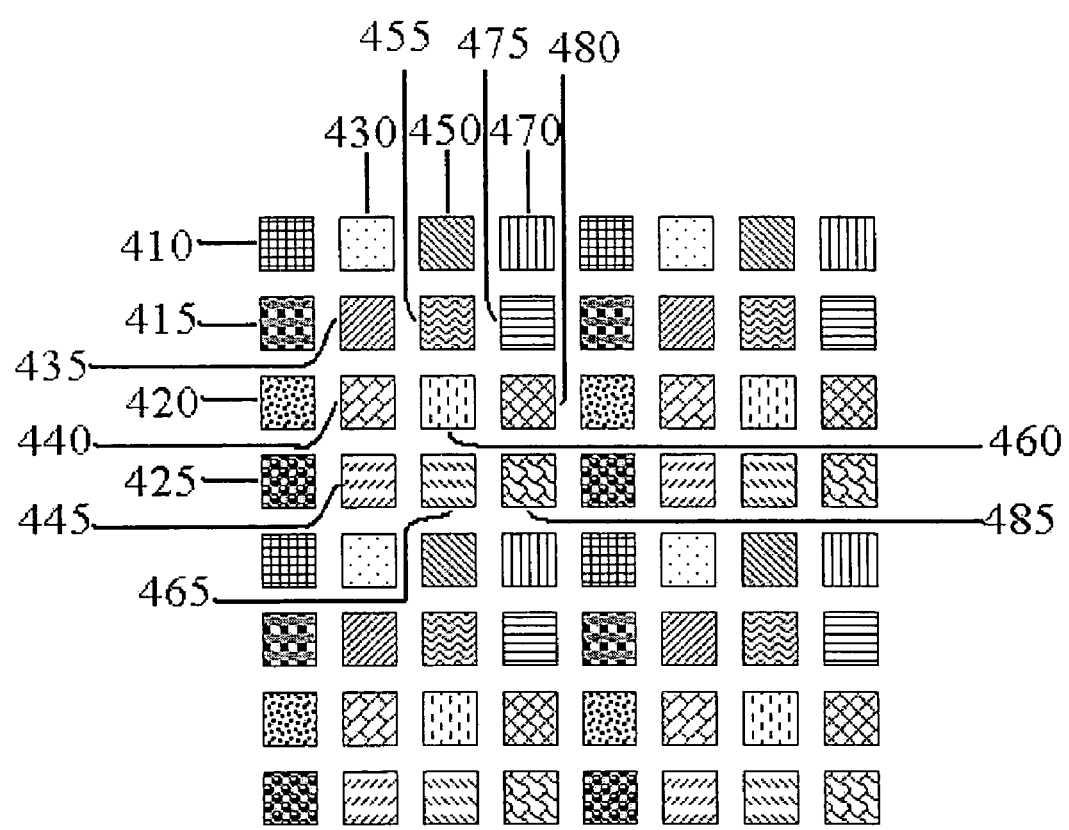
FIG. 4 shows another filter mosaic pattern with a 4 by 4 array mosaic.

Turning now to FIG. 1, a filter pattern is shown comprising, in this case, 4 filters 110, 120, 130 and 140, which repeat in a 2 by 2 mosaic pattern. FIG. 2, FIG. 3 and FIG. 4 show additional mosaic patterns. FIG. 2 shows a 3 by 3 repeating mosaic pattern comprising the filters labeled 210, 220, 230, 240, 250, 260, 270, 280 and 290 which appear in the 3 by 3 pattern, and then repeat over the mosaic. In the figure, a pair of repetitions is shows vertically and horizontally. In practice many more repetitions will occur, so as to cover the face of a sensor array as described herein. FIG. 4 shows a 4 by 4 repeating mosaic pattern comprising filters 410, 415, 420, 425, 430, 435, 440, 445, 450, 455, 460, 465, 470, 475, 480, and 485. The filter patterns shown are consistent with the prior art and, when combined with the processing disclosed herein, are appropriate for use with an embodiment of the present invention. FIG. 3 shows a mosaic corresponding to the Bayer pattern. For the present invention, essentially any predetermined filter pattern can be used, and the ones shown in FIGS. 1, 2, 3 and 4 are simply examples.

The filters such as 110, 120, 130 and 140, 210-290, and 410-485 can be spectral band-pass filters, or more complicated coded or weighted spectral filters, and/or other filters including but not limited to spatial filters, custom lenses or lenselets, and spatio-spectral filters. Options for spectral encoding include but are not limited to spectral Hadamard codes. For example each pixel in the 4 by 4 array of sensor filter elements shown in FIG. 4 could measure eight bands among 16 possibilities. The bands can be picked to cover uniformly or non-uniformly the whole spectral range, as is standard in the art of Hadamard multiplexing. In this way, each individual band can be recovered from the knowledge of all 16 multiplexed measurements. One advantage of this embodiment is that more photons are collected per sensor in a given period of time, enabling fast acquisition at lower integration times given the same photonic flux. Another advantage of this embodiment is that the interpolation from the resulting high resolution multiplexed image is improved for some applications.

As one other example of the kinds of filters that can be used in accordance with an embodiment of the present invention directed at wide field of view imaging, the filters 110, 120, 130 and 140 can be taken to be 4 different spatial filters that measure weighted linear combinations of the portion of the scene impinging on the 4 pixels, in 4 different sectors of a wide field of view image. In this way the techniques disclosed herein will allow for the substantial reconstruction of a wider field-of-view image.

Figure 5:
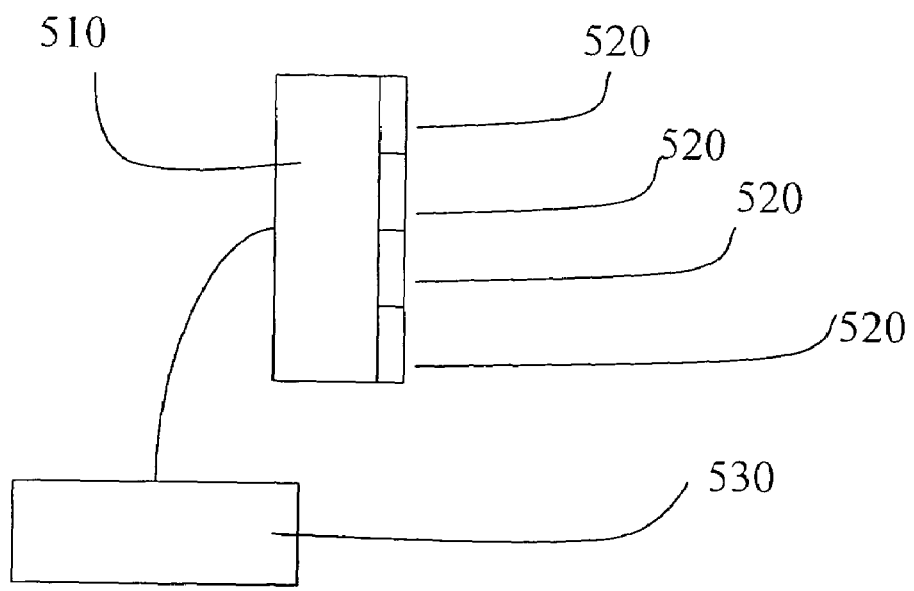
FIG. 5 shows a system diagram for a device in accordance with an exemplary embodiment of the present invention.

FIG. 5 shows a system diagram of a device in accordance with the present invention, which is comprised of a sensor array 510, a mosaic filter 520 (shown in FIG. 5 as 4 parts collectively numbered 520, to indicate that 520 is comprised of a mosaic of filters), such as but not limited to the filters shown in more detail in FIGS. 1-4, and a data acquisition and processing module 530. Light from a scene is imaged through the mosaic filter 520, to the sensor array 510. The output of the sensor array 510 is acquired and process by the module 530 in accordance with the present invention.

Figure 6:
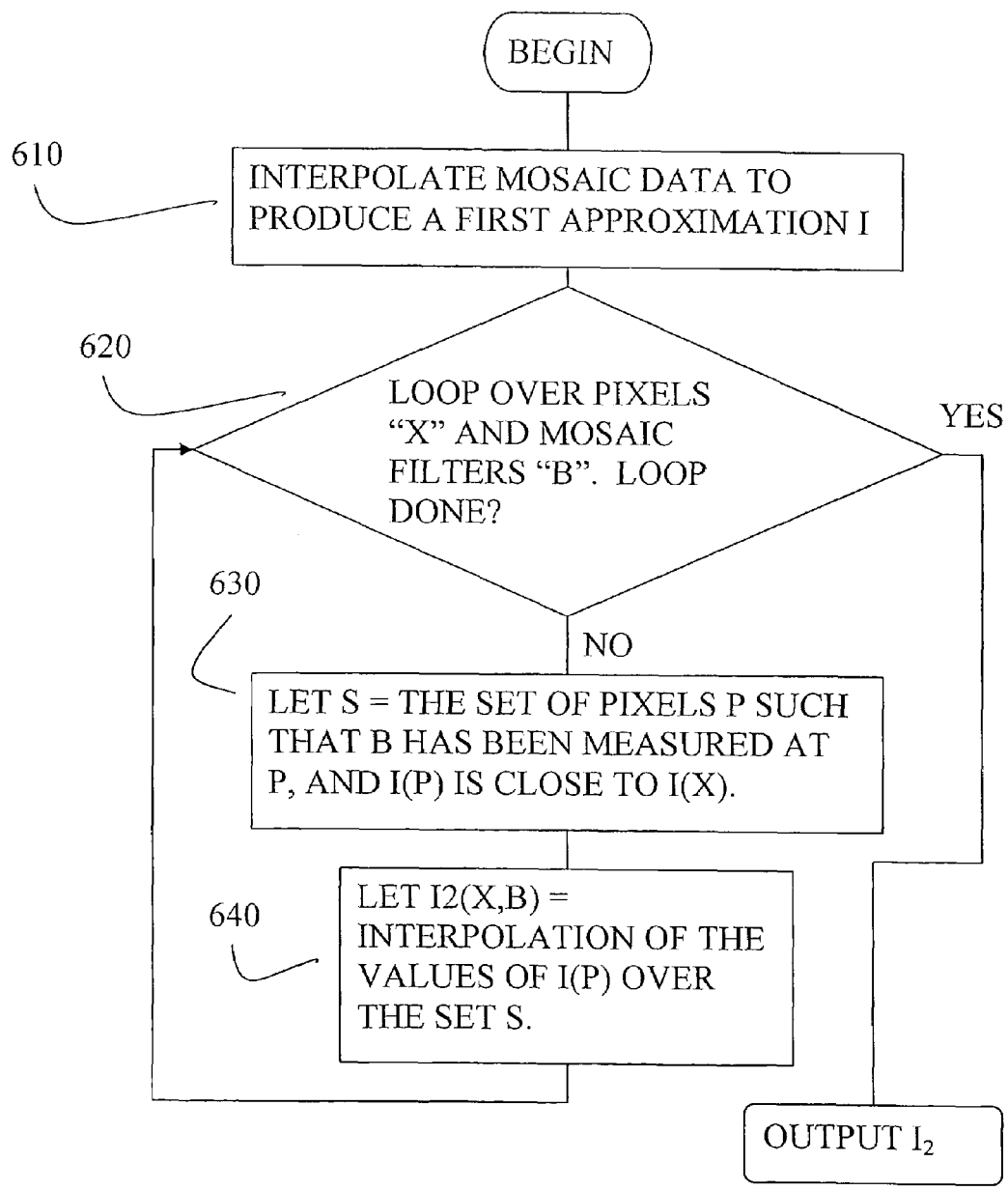
FIG. 6 shows a flowchart for a process in accordance with an exemplary embodiment of the present invention, for filling in data from the output of a mosaic sensor in accordance an exemplary embodiment of the present invention.

FIG. 6 shows a flowchart for a process in accordance with an embodiment of the present invention, for filling in data from the output of a mosaic sensor in accordance with the present invention. The acquisition and processing module 530 interpolates the mosaic-acquired-data as a first approximation I in step 610. This is comprised of, for example, extending each spectral filter measured by all pixels that have measured the given spectral filter, by interpolating, including but not limited to using a bilinear interpolation, to fill in values for this missing filter at the other pixels where the given filter has not been measured, thereby obtaining a first estimate of the true value of the filter response at each pixel of the image. An inquiry is made in step 620 to determine if each pixel for each filter has been measured and approximated. If the inquiry at step 620 is answered in the affirmative, the acquisition and processing module 530 outputs $I_2$.

If the inquiry at step 620 is answered in the negative, the acquisition and processing module 530 proceeds and repeats steps 630 and 640 for each pixel "x" and for each spectral filter "b." The acquisition and processing module 530 selects the set of pixels for which "b" has been measured, and for which, in addition, the first approximation full spectral vector is close to that of "x" (that is I(the pixel) is close to I(x)) in step 630. Then in step 640, the acquisition and processing module 530 obtains a second approximation to the true value of a spectral filter value "b" at "x" by interpolating from the values of that band "b" for the pixels selected in step 630.

Figure 7:
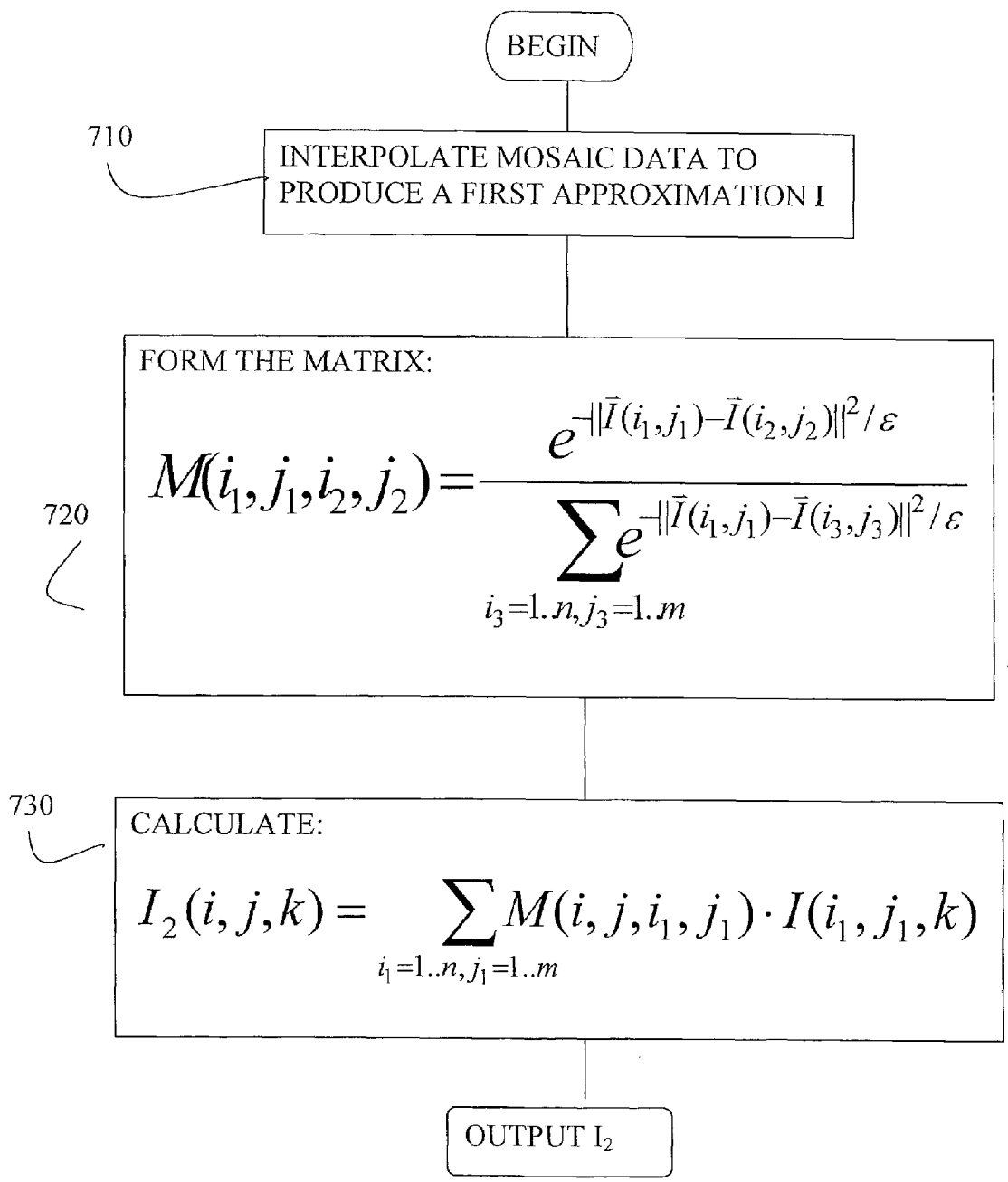
FIG. 7 shows a flowchart for a process in accordance with an exemplary embodiment of the present invention, for filling in data from the output of a mosaic sensor in accordance with an exemplary embodiment of the present invention.

Turning now to the details of a mathematical computation in accordance with an embodiment of the present invention, these comprise interpolating a sub-sampled vector-valued function to a fully sampled reconstruction, wherein the interpolation includes a way, for each pixel, to combine known information about other pixels of the same chemistry (in as much as spectral information corresponds to chemistry). An embodiment of the process is shown in FIG. 7, with a parameter $\epsilon$ having a predetermined value that determines the threshold of sensitivity of the algorithm, and comprising the steps of:

710: Interpolate the acquired data bilinearly, resulting in an n×m×L multispectral datacube I(i, j, k), (where i and j are spatial indices, and k is spectral index).

720: Form the matrix:

$$M(i_1, j_1, i_2, j_2) = \frac{e^{-\|I(i_1,j_1)-I(i_2,j_2)\|^2/\varepsilon}}{\sum_{i_3=1...n, j_3=1...m} e^{-\|I(i_1,j_1)-I(i_3,j_3)\|^2/\varepsilon}},$$

where $I(i, j)$ denotes the vector $<I(i, j, 1), I(i, j, 2), \ldots, I(i, j, L)>$, (that is, with i and j fixed, k ranging over all values from $1 \ldots L$)

730: For $k=1 \ldots L$, calculate the reconstructed multispectral datacube $\tilde{I}(i, j, k)$, as follows:

$$\tilde{I}(i, j, k) = \sum_{i_1=1...n, j_1=1...m} M(i, j, i_1, j_1) \cdot I(i_1, j_1, k)$$

Note that the function $e^{-x^2/\varepsilon}$ in the above formulas can be replaced by any suitable kernel function, including but not limited to the characteristic function of a neighborhood of 0. That is, one can take a more general formula in step 720, substantially equivalent to the following:

$$M(i_1, j_1, i_2, j_2) = \frac{f(\bar{I}(i_1, j_1), \bar{I}(i_2, j_2), \varepsilon)}{\sum_{i_3=1...n, j_3=1...m} f(\bar{I}(i_1, j_1), \bar{I}(i_3, j_3), \varepsilon)},$$

for any non-negative function f taking 2 vectors and one scalar arguments, wherein f has a maximum wherever the 2 vector arguments are the same, and goes to zero as the distance between the two vector arguments increases to infinity, and, except at the maximum, goes to zero as the scalar argument goes to infinity.

In a variation on the above algorithm, one can take the sum in step 730 only over those pixels $(i_1, j_1)$ that are near $(i, j)$. For example, within a fixed square region centered at $(i, j)$. For example, if such a square has side length $2C+1$, then take:

$$\tilde{\tilde{I}}(i, j, k) = \sum_{i_1=i-C...i+C, j_1=j-C...j+C} M(i, j, i_1, j_1) \cdot I(i_1, j_1, k)$$

Of course the sum can be taken over an oval region, or any other predetermined region. Note that these constitute linear filtering of the original vector-valued image I, but with a filter that depends on I, so the process is, in general, a non-linear filtering.

Some embodiments of the present invention comprise systems for the non-linear filtering of vector valued data as disclosed herein, applied to a variety of applications beyond the use of reconstruction of spectral data from the multispectral camera systems described herein. One class of examples include the denoising of images and video sequences.

An embodiment for the denoising of an image comprises the following steps. Given an image $I_1(i, j)$, associate a vector valued image $I(i, j, k)$, by taking the values of $I_1(i, j)$ in a rectangle around $(i, j)$. In other words, number the points in, say, a 5×5 rectangle (or 3×3 or 4×4, etc), from, say, 1 to 25 (or $1 \ldots 9$, or $1 \ldots 16$, respectively, etc). Then, for each pixel $(i, j)$, calculate $I(i, j, k)$ for $k=1 \ldots 25$ by taking the values of $I_1$ at the corresponding 25 numbered locations around $(i, j)$. Next, apply the algorithm disclosed herein to compute $\tilde{I}$ or $\tilde{\tilde{I}}$, and these will provide denoised versions of the original image. Of course, there are other methods to extent the original image $I(i, j)$ to a vector-valued image $I(i, j, k)$, and the technique described extends to these. For datasets including but not limited to videos, seismic data and hyperspectral image sets, the data is already of the form $I(i, j, k)$ and so, again, the embodiments described apply as methods to denoise or otherwise compress or enhance this data. Compression, for example, can be accomplished by down-sampling this data in a way analogous to the way in which the multispectral cameras described herein sub-sample spectral data. In the general case, this results in a lower-resolution image, that can be processed as described herein. The steps of such a processing can be described as the steps of 1) magnification of the image, to produce a high resolution image, 2) formation of a vector valued image (e.g. in the 5×5 rectangle discussion above); 3) computation of $\tilde{I}$ or $\tilde{\tilde{I}}$ as a reconstructed image.

One skilled in the art of diffusion mathematics will see that the techniques disclosed herein relate in part to methods for approximate expanding of functions on the top few diffusion coordinates of associated graphs. To this end, the embodiments above describe the application of a filtering operation to the original image data $I(i, j)$, or $I(i, j, k)$, in order to produce new image data $\tilde{I}$ or $\tilde{\tilde{I}}$. The reader is referred to U.S. patent application Ser. No. 11/165,633, Coifman et al., and U.S. patent application Ser. No. 11/230,949, Geshwind et al., both of which are incorporated by reference in their entirety.

Instead or in addition, the filtering operation can be applied to other functions of $(i, j, k)$. For example $j(i, j, k)=j$; or $z(i, j, k)=(i, j)$ (i.e. a function from $R^3$ to $R^2$). For this last function, $z$, application of the algorithms described has applications to the problem of image registration. For another example, expanding the 5×5 example disclosed herein to include a series of addition coordinates generated by the action of say a grand tour path within the linear group, yields an algorithm for rapidly generating so-called fractal encoding coefficients of the original data.

The diffusion graph of the various spectral measurements (i.e. the graph consisting of all spectra labeled by the pixel) reorganizes the image into clusters of similar pixel spectra with low bandwidth (bandwidth here is in the sense of information content, and not photonic spectral range). In this way, an embodiment of the present invention comprises determining the correspondence of the material content or chemistry in the image across the pixels of the sensor. This ability to organize the sub-sampled spectra enables the identification of the different material regions or spatial chemical distributions in the scene. The knowledge of the distribution of materials in the scene imaged on the sensor is used to deduce the value of the missing spectral information. We estimate the true spectrum of each individual pixel at a given band, by considering all points in the same cluster neighborhood for which that band is known, and infer the missing value. That is: we infer unknown spectral values for a first pixel from spectral values that are known for this first pixel, but restricting to looking at other pixels of the same chemistry as the first pixel. When each material occurs in sufficiently many places in the scene the success of this method of spectral imagery is assured.

An embodiment of the present invention comprises a standard color CCD sensor disposed to measure red, green and blue pixels of a color image in a mosaicked pattern such as those that are standard in the art, including but not limited to the Bayer pattern. In this embodiment, the mathematical algorithms described herein provide for an improved method of demosaicking the images acquired with such standard color cameras.

Another embodiment of the multispectral camera comprises additionally a beam splitter, creating two copies of the input image. Each copy is sent to a different CCD, with potentially different mosaics of wavelength. In an exemplary embodiment, at least one pixel in each mosaic co-set, for the two different CCDs, corresponds to the same spectral filter. In this way, the two images can be registered. This split system allows for, say, twice as many wavelengths per pixel/region, without having to spread occurrences of the same wavelengths further apart.

Some embodiments of the present invention comprise the use of the first approximation or second approximation spectral vectors such as those obtained by the method in FIG. 6, to track the motion of various pixels in a scene. This is accomplished by exploiting the fact that these multispectral images contain a spectral vector for each pixel. In a video mode, this results in vector valued video. In the present aspect, motion tracking algorithms are disposed to act on said vector valued video, for enhanced and improve motion tracking.

In an embodiment of the present invention, for each individual location or spatial resolution element in the image of the scene on the sensor we identify its true spectrum in a given band by imaging the scene until the location is imaged or sensed by a sensor measuring that band. Since locations in the scene are tracked in this manner, all spectra of locations will eventually be recorded if the relation of the camera to scene changes from frame to frame resulting in a spatial shift of the image on the distributed spectrally discriminating sensors.

While the foregoing has described and illustrated aspects of various embodiments of the present invention, those skilled in the art will recognize that alternative components and techniques, and/or combinations and permutations of the described components and techniques, can be substituted for, or added to, the embodiments described herein. It is intended, therefore, that the present invention not be defined by the specific embodiments described herein, but rather by the appended claims, which are intended to be construed in accordance with the well-settled principles of claim construction, including that: each claim should be given its broadest reasonable interpretation consistent with the specification; limitations should not be read from the specification or drawings into the claims; words in a claim should be given their plain, ordinary, and generic meaning, unless it is readily apparent from the specification that an unusual meaning was intended; an absence of the specific words "means for" connotes applicants' intent not to invoke 35 U.S.C. §112 (6) in construing the limitation; where the phrase "means for" precedes a data processing or manipulation "function," it is intended that the resulting means-plus-function element be construed to cover any, and all, computer implementation(s) of the recited "function"; a claim that contains more than one computer-implemented means-plus-function element should not be construed to require that each means-plus-function element must be a structurally distinct entity (such as a particular piece of hardware or block of code); rather, such claim should be construed merely to require that the overall combination of hardware/firmware/software which implements the invention must, as a whole, implement at least the function(s) called for by the claim's means-plus-function element(s).

We claim:

1. A multi-spectral imaging apparatus, comprising:
an array of filters in a mosaic pattern;
a sensor array disposed to receive an image that has been filtered by said array of filters; and
an acquisition and processing module disposed to receive the output of said sensor array and for processing said output of said sensor array to provide a processed image, wherein said acquisition and processing module is operable to:
perform a first interpolation on said output of said sensor array to provide a first approximation; and
perform a second interpolation on the values of said first approximation to provide a second approximation by approximating values at each pixel of said processed image by, for each given pixel in said processed image, interpolating over the values from said first approximation evaluated at those other pixels for which the values of said first approximation at said other pixels are close to the values at said given pixel.

2. The apparatus of claim 1, wherein said sensor array comprises a plurality of pixels; wherein said first approximation comprises a vector of values comprising values corresponding to each of said filters for each pixel in said plurality of pixels; and wherein said acquisition and processing module is operable to perform said second interpolation on the values of said first approximation to provide said second approximation by approximating values at each pixel of said processed image by, for each given pixel in said processed image, and each given filter, interpolating over the values corresponding to said given filter from said first approximation evaluated at those other pixels for which said vector of values of said first approximation at said other pixels are close to said vector of values at said given pixel.

3. The apparatus of claim 2, wherein said array of filters is an array of spectral filters.

4. The apparatus of claim 2, wherein said acquisition and processing module is operable to detect and track explosives.

5. The apparatus of claim 2, wherein said acquisition and processing module is operable to detect and track biohazards.

6. The apparatus of claim 2, wherein said acquisition and processing module is operable to recognize target automatically.

7. The apparatus of claim 2, wherein said acquisition and processing module is operable to perform said first interpolation by interpolating said output of sensor array bilinearly to provide an (n×m×L) multispectral data cube I(i, j, k), where i and j are spatial indices and k is spectral index.

8. The apparatus of claim 2, wherein said acquisition and processing module is operable to perform said second interpolation by:
forming a matrix $$M(i_1, j_1, i_2, j_2) = \frac{f(\overline{I}(i_1, j_1), \overline{I}(i_2, j_2), \varepsilon)}{\sum_{i_3=1\ldots n, j_3=1\ldots m} f(\overline{I}(i_1, j_1), \overline{I}(i_3, j_3), \varepsilon)},$$

where $\overline{I}(i, j)$ denotes the vector $<I(i, j, 1), I(i, j, 2), \ldots, I(i, j, L)>$, with i and j fixed, k ranging over all integer values from 1 to L; and
calculating a reconstructed multispectral datacube $$\tilde{I}(i, j, k) = \sum_{i_1=1\ldots n, j_1=1\ldots m} M(i, j, i_1, j_1) \cdot I(i_1, j_1, k)$$

for k ranging over all integer values from 1 to L.

9. The apparatus of claim 8, wherein said acquisition and processing module is operable to perform said second interpolation by forming a matrix:

$$M(i_1, j_1, i_2, j_2) = \frac{e^{-\|\bar{I}(i_1,j_1)-\bar{I}(i_2,j_2)\|^2/\varepsilon}}{\sum_{i_3=1\ldots n, j_3=1\ldots m} e^{-\|\bar{I}(i_1,j_1)-\bar{I}(i_3,j_3)\|^2/\varepsilon}},$$

where $\bar{I}(i, j)$ denotes the vector $<I(i, j, 1), I(i, j, 2), \ldots, I(i, j, L)>$, with i and j fixed, k ranging over all integer values from 1 to L.

10. The apparatus of claim 9, wherein said acquisition and processing module is operable to perform said second interpolation by calculating a reconstructed multispectral datacube:

$$\tilde{I}(i, j, k) = \sum_{i_1=i-C\ldots i+C, j_1=j-C\ldots j+C} M(i, j, i_1, j_1) \cdot I(i_1, j_1, k)$$

for a fixed square region centered at (i, j) and having a length of 2C+1.

11. A method of multi-spectral imaging, comprising the steps of:
receiving an image that has been filtered by an array of filters in a mosaic pattern by a sensor array; and
processing said output of said sensor array by an acquisition and processing module to provide a processed image by:
performing a first interpolation on said output of said sensor array to provide a first approximation; and
performing a second interpolation on the values of said first approximation to provide a second approximation by approximating values at each pixel of said processed image by, for each given pixel in said processed image, interpolating over the values from said first approximation evaluated at those other pixels for which the values of said first approximation at said other pixels are close to the values at said given pixel.

12. The method of claim 11, wherein said sensor array comprises a plurality of pixels; and further comprising the steps of:
performing said first interpolation on said output of said sensor array to provide said first approximation comprising a vector of values comprising values corresponding to each of said filters for each pixel in said plurality of pixels; and
performing interpolation on the values of said first approximation to provide said second approximation by approximating values at each pixel of said processed image by, for each given pixel in said processed image, and each given filter, interpolating over the values corresponding to said given filter from said first approximation evaluated at those other pixels for which said vector of values of said first approximation at said other pixels are close to said vector of values at said given pixel.

13. The method of claim 12, wherein the step of receiving comprises the step of receiving said image that has been filtered by an array of spectral filters in a mosaic pattern by a sensor array.

14. The method of claim 12, wherein the step of processing comprises the step of processing said output of said sensor array to detect and track explosives.

15. The method of claim 12, wherein the step of processing comprises the step of processing said output of said sensor array to detect and track biohazards.

16. The method of claim 12, wherein the step of processing comprises the step of processing said output of said sensor array to recognize target automatically.

17. The method of claim 12, wherein the step of performing said first interpolation comprises the step of interpolating said output of sensor array bi-linearly to provide an (n×m×L) multispectral data cube I(i, j, k), where i and j are spatial indices and k is spectral index.

18. The method of claim 12, wherein the step of performing said second interpolation comprises the steps of:
forming a matrix $$M(i_1, j_1, i_2, j_2) = \frac{f(\bar{I}(i_1, j_1), \bar{I}(i_2, j_2), \varepsilon)}{\sum_{i_3=1\ldots n, j_3=1\ldots m} f(\bar{I}(i_1, j_1), \bar{I}(i_3, j_3), \varepsilon)},$$

where $\bar{I}(i, j)$ denotes the vector $<I(i, j, 1), I(i, j, 2), \ldots, I(i, j, L)>$, with i and j fixed, k ranging over all integer values from 1 to L; and
calculating a reconstructed multispectral datacube $$\tilde{I}(i, j, k) = \sum_{i_1=1\ldots n, j_1=1\ldots m} M(i, j, i_1, j_1) \cdot I(i_1, j_1, k)$$

for k ranging over all integer values from 1 to L.

19. The method of claim 18, wherein the step of performing said second interpolation comprises the steps of forming a matrix:

$$M(i_1, j_1, i_2, j_2) = \frac{e^{-\|\bar{I}(i_1,j_1)-\bar{I}(i_2,j_2)\|^2/\varepsilon}}{\sum_{i_3=1\ldots n, j_3=1\ldots m} e^{-\|\bar{I}(i_1,j_1)-\bar{I}(i_3,j_3)\|^2/\varepsilon}},$$

where $\bar{I}(i, j)$ denotes the vector $<I(i, j, 1), I(i, j, 2), \ldots, I(i, j, L)>$, with i and j fixed, k ranging over all integer values from 1 to L.

20. The method of claim 19, wherein the step of performing said second interpolation comprises the step of calculating a reconstructed multispectral datacube:

$$\tilde{I}(i, j, k) = \sum_{i_1=i-C\ldots i+C, j_1=j-C\ldots j+C} M(i, j, i_1, j_1) \cdot I(i_1, j_1, k)$$

for a fixed square region centered at (i, j) and having a length of 2C+1.

* * * * *